US011600001B2

(12) United States Patent
Lee et al.

(10) Patent No.: US 11,600,001 B2
(45) Date of Patent: Mar. 7, 2023

(54) IMAGE SEGMENTATION METHOD, APPARATUS, AND COMPUTER PROGRAM TO IDENTIFY OBJECTS IN IMAGES (71) Applicant: University-Industry Coop. Grp. Of Kyung Hee Univ., Gyeonggi-do (KR)

(72) Inventors: Sung Young Lee, Gyeonggi-do (KR); Cam Hao Hua, Gyeonggi-do (KR)

(73) Assignee: UNIVERSITY-INDUSTRY COOPERATION GROUP OF KYUNG HEE UNIVERSITY, Gyeonggi-Do (KR)

( * ) Notice: Subject to any disclaimer, the term of this patent is extended or adjusted under 35 U.S.C. 154(b) by 0 days.

(21) Appl. No.: 17/497,875

(22) Filed: Oct. 8, 2021

(65) Prior Publication Data
US 2022/0058805 A1     Feb. 24, 2022

Related U.S. Application Data (63) Continuation of application No. 16/584,572, filed on Sep. 26, 2019, now Pat. No. 11,145,061.

(30) Foreign Application Priority Data

May 14, 2019  (KR) .................. 10-2019-0056000

(51) Int. Cl.
*G06K 9/62* (2022.01)
*G06N 3/04* (2006.01)
*G06T 7/10* (2017.01)
(52) U.S. Cl.
CPC .............. *G06T 7/10* (2017.01); *G06K 9/6267* (2013.01); *G06N 3/0481* (2013.01)

(58) Field of Classification Search
None
See application file for complete search history.

(56) References Cited

U.S. PATENT DOCUMENTS 10,482,639 B2 * 11/2019 Li ........................ G06N 3/084
2018/0268526 A1 * 9/2018 Mentl ................... G06T 11/008

OTHER PUBLICATIONS

Office Action for JP2019-211447, dated Dec. 23, 2020, including English translation, 8 pages.
(Continued)

*Primary Examiner* — Idowu O Osifade
(74) *Attorney, Agent, or Firm* — Adsero IP (57) ABSTRACT The disclosure relates to an image segmentation method and apparatus, and a computer program thereof. The image segmentation apparatus according to the disclosure may include an encoding module configured to obtain a plurality of feature maps having different resolutions with respect to an input image, using an artificial neural network including one or more residual blocks, and a decoding module configured to generate one prediction map from pairs of adjacent feature maps among the plurality of feature maps in bracket-shaped manner, wherein the decoding module performs one or more decoding rounds, each decoding round includes one or more ATF modules that generate a combined feature map using a high-resolution feature map having a higher resolution among an adjacent feature map pair constituting the feature map generated in the previous round and a low-resolution feature map having a lower resolution thereof, and the decoding round is repeatedly performed until the one prediction map is generated. According to the disclosure, it is possible to combine local information and global context in a balanced manner.

16 Claims, 5 Drawing Sheets

(56) References Cited

OTHER PUBLICATIONS

Matsumoto et al., "Continuous learning by image conversion networks", from a forum relating to eleventh engineering and information management (first annual competition in the seventeenth annual meeting), Japan, Mar. 6, 2019.
Zhou et al., UNet++: A Nested U-Net Architecture for Medical Image Segmentation, retrieved from htts://arXiv:1807.10165 on 3/1/21n.
Chen, L.C., et al., 2017, "Deeplab: Semantic Image Segmentation With Deep Convolutional Nets, Atrous Convolution and Fully Connected CRFs", arXiv:1606.00915v2 [cs.CV] May 12, 2017, pp. 1-14.
He, K., et al., Jun. 2016, "Deep Residual Learning for Image Recognition", The IEEE Conference on Computer Vision and Pattern Recognition (CVPR), pp. 770-778.
Simonyan, K., et al., 2015, "Very Deep Convolutional Networks for Large-Scale Image Recognition", ICLR 2015 Conference Paper, pp. 1-14, arXiv:1409.1556v6 [cs.CV] Apr. 10, 2015.
Li et al., "Pyramid Attention Network for Semantic Segmentation", arXiv:1805.10180v3 [cs.CV] Nov. 25, 2018, 13 pages.
Office Action for KR application 10-2019-0056000, dated Jul. 21, 2020 along with the English Translation, 8 pages.
Zhang et al., "ExFuse: Enhancing Feature Fusion for Semantic Segmentation", retrieved on SpringerLink: https://link.springer.com/conference/eccv.

\* cited by examiner

IMAGE SEGMENTATION METHOD, APPARATUS, AND COMPUTER PROGRAM TO IDENTIFY OBJECTS IN IMAGES

CROSS-REFERENCE TO RELATED APPLICATIONS

This application is a continuation of U.S. application Ser. No. 16/584,572, filed Sep. 26, 2019, which is entitled "IMAGE SEGMENTATION METHOD, APPARATUS, AND COMPUTER PROGRAM TO IDENTIFY OBJECTS IN IMAGES", which claims the priority benefit of Korean application number 10-2019-0056000 filed May 14, 2019 entitled "Method Apparatus and Computer Program for Image Segmentation", which are incorporated herein by reference in their entirety. Any disclaimer that may have occurred during the prosecution of the above-referenced applications is hereby expressly rescinded, and reconsideration of all relevant art is respectfully requested.

BACKGROUND OF THE INVENTION

1. Field of the Invention

The disclosure relates to an image segmentation method and apparatus and a computer program thereof and, more particularly to, a semantic image segmentation method and apparatus that can be efficiently applied to perception-related applications such as autonomous driving, augmented reality, and the like, and a computer program thereof.

2. Description of the Prior Art

Over the past few years, tremendous growth in power of computational resources and quantity of visual data has enabled deep learning to be intensively exploited in diverse computer vision tasks for further industrial applications. A convolutional neural network (hereinafter, referred to as "CNN") as one of the most well-known deep learning techniques, has attracted numerous researchers thanks to its significant performance boost in various problems ranging from categorizing overall content to labeling every single pixel of images.

Specifically, the former is basically referred to as classification issue at image level (Prior Art 1), while the latter (Prior Art 2) is called semantic segmentation because it takes one step further by performing the same operation at the pixel level.

Since the rapid development of recent recognition-related applications, such as augmented reality, computer photography, autonomous driving, to name a few, requires classification capabilities at pixel level to fully understand a given scene, such pixel-wise labeling problem remains as an open research area.

In order to solve this pixel-wise grouping problem in general, most existing researches use CNN, which is mainly designed to classify images such as in VGGNet (Prior art document 3). Specifically, shallow layers capture finely patterned features but weakly learn the semantic properties due to partial view on an original input. Oppositely, deep layers acquire feature maps which depict abstract appearance (also known as, coarse pattern) but carry semantically rich information due to multiple subsampling stages and larger field of view on the input image, respectively. In other words, after a feed forwarding process of CNN where the spatial resolution of a learned feature map is gradually decreased, local and global context information are continuously extracted and represented in depth dimension. Thus, the semantic segmentation problem can be said to be how to produce a densely labeled output having same size as that of the input, that is, the design of an optimal upsampling strategy. To find the optimal upsampling strategy, it is necessary to find a method of combining local information (finely-patterned features) and a global context (semantically rich features) obtained from all layers from shallow to deep layers of a backbone CNN, in a balanced manner.

PRIOR ART DOCUMENTS

Non-Patent Documents

Prior art document 1: K. Simonyan and A. Zisserman: 'Very deep convolutional networks for large-scale image recognition,' CoRR, vol. abs/1409.1556, 2014

Prior art document 2: L. C. Chen, G. Papandreou, I. Kokkinos, K. Murphy, and A. L. Yuille, 'Deeplab: Semantic image segmentation with deep convolutional nets, atrous convolution and fully connected crfs,' IEEE Transactions on Pattern Analysis and Machine Intelligence, vol. 40, no. 4, pp. 834-848, April 2018

Prior art document 3: Simonyan and A. Zisserman: 'Very deep convolutional networks for large-scale image recognition,' CoRR, vol. abs/1409.1556, 2014

Prior Document 4: K. He, X. Zhang, S. Ren, and J. Sun, 'Deep residual learning for image recognition,' in 2016 IEEE Conference on Computer Vision and Pattern Recognition (CVPR), June 2016, pp. 770-778

SUMMARY OF THE INVENTION

The disclosure has been made in order to solve the above-mentioned problems in the prior art and an aspect of the disclosure is to provide a method of combining local information and a global context in a balanced manner.

Another aspect of the disclosure is to provide a new method of improving the accuracy of object identification in an image by allowing semantically rich information to be utilized exhaustively for segmentation.

Still another of the disclosure is to provide an advanced technique that can integrate semantically rich information with finely patterned features and effectively perform end-to-end learning by proposing a new bracket structure as the structure of a CNN-based decoding module 11.

In accordance with an aspect of the disclosure, there is provided an image segmentation apparatus including an encoding module configured to obtain a plurality of feature maps having different resolutions with respect to an input image, using an artificial neural network including one or more residual blocks; and a decoding module configured to generate one prediction map using pairs of adjacent feature maps among the plurality of feature maps, wherein the decoding module performs one or more decoding rounds, each decoding round includes one or more Attention-embedded Threefold Fusion (hereinafter, referred to as "ATF") modules that generate a combined feature map using a high-resolution feature map having a higher resolution among an adjacent feature map pair constituting the feature map generated in the previous round and a low-resolution feature map having a lower resolution thereof, and the decoding round is repeatedly performed until the one prediction map is generated.

In addition, the ATF module may generate the combined feature map by combining an upsampled low-resolution feature map obtained by upsampling the low-resolution feature map and the high-resolution feature map.

In addition, the ATF module includes an upsampling unit configured to upsample the low-resolution feature map, an attention unit configured to collect context information of the low-resolution feature map by applying multiple non-linear function layers to the low-resolution feature map and to readjust the high-resolution feature map using the collected context information, and a summation unit configured to sum the high-resolution feature map, the readjusted high-resolution feature map, and the upsampled low-resolution feature map.

As described above, according to the disclosure, it is possible to combining local information and a global context in a balanced manner.

In addition, according to the disclosure, it is possible to allow semantically rich information to be utilized exhaustively for segmentation, thereby improving the accuracy of object identification in an image.

Further, according to the disclosure which can use a new bracket structure as the structure of a CNN decoding module 11, it is possible to integrate semantically rich information with finely patterned features and to effectively perform end-to-end learning.

BRIEF DESCRIPTION OF THE DRAWINGS

The above and other aspects, features and advantages of the disclosure will be more apparent from the following detailed description taken in conjunction with the accompanying drawings, in which.

DETAILED DESCRIPTION OF THE EXEMPLARY EMBODIMENTS

The above and other objects, features, and advantages of the disclosure will become more apparent by describing in detail exemplary embodiments thereof with reference to the attached drawings, which are not intended to limit the scope of the disclosure. In the following description, well-known functions or constructions are not described in detail since they would obscure the disclosure in unnecessary detail. Hereinafter, preferred embodiments of the disclosure will be described in detail with reference to the accompanying drawings. In the drawings, the same reference numerals are used to designate the same or similar components, and all combinations described in the specification and claims can be combined in any manner. The expression of singular form includes the expression of plural form as long as it is not apparently different from the expression of the plural form in the context.

According to the disclosure, a convolutional artificial neural network with unique architecture is used. In the present specification, the convolutional artificial neural network according to an embodiment of the disclosure is referred to as a bracket-style convolutional neural network, and hereinafter, referred to as a B-Net for convenience of description.

Figure 1:
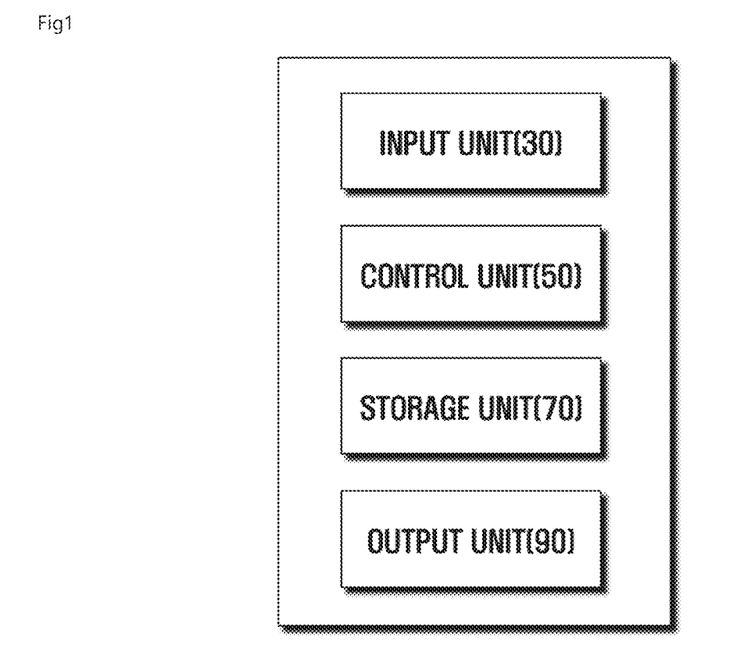
FIG. 1 is a diagram illustrating an image segmentation apparatus according to an embodiment of the disclosure.

FIG. 1 is a diagram illustrating an image segmentation apparatus according to an embodiment of the disclosure. Referring to FIG. 1, the image segmentation apparatus according to an embodiment of the disclosure may include an input unit 30, a control unit 50, a storage unit 70, and an output unit 90.

The input unit 30 may receive an image. The control unit 50 may be a processor and may perform image segmentation according to an embodiment of the disclosure. A specific embodiment of the operation of the control unit 50 will be described later with reference to FIG. 3.

The storage unit 70 may store a previously learned machine learning framework using a plurality of images according to an embodiment of the disclosure, and may store input data and output data.

The output unit 90 may output an image segmentation result according to an embodiment of the disclosure. The output unit 90 may provide the segmentation result of the input image through a user interface. A pixel-wise label and object-wise label information may be provided as the results, and each object (segment) may be displayed in different colors depending on classification and labeling results. This is based on a predetermined value, and the predetermined value can be generated by a user and stored in the storage unit 70.

Figure 2:
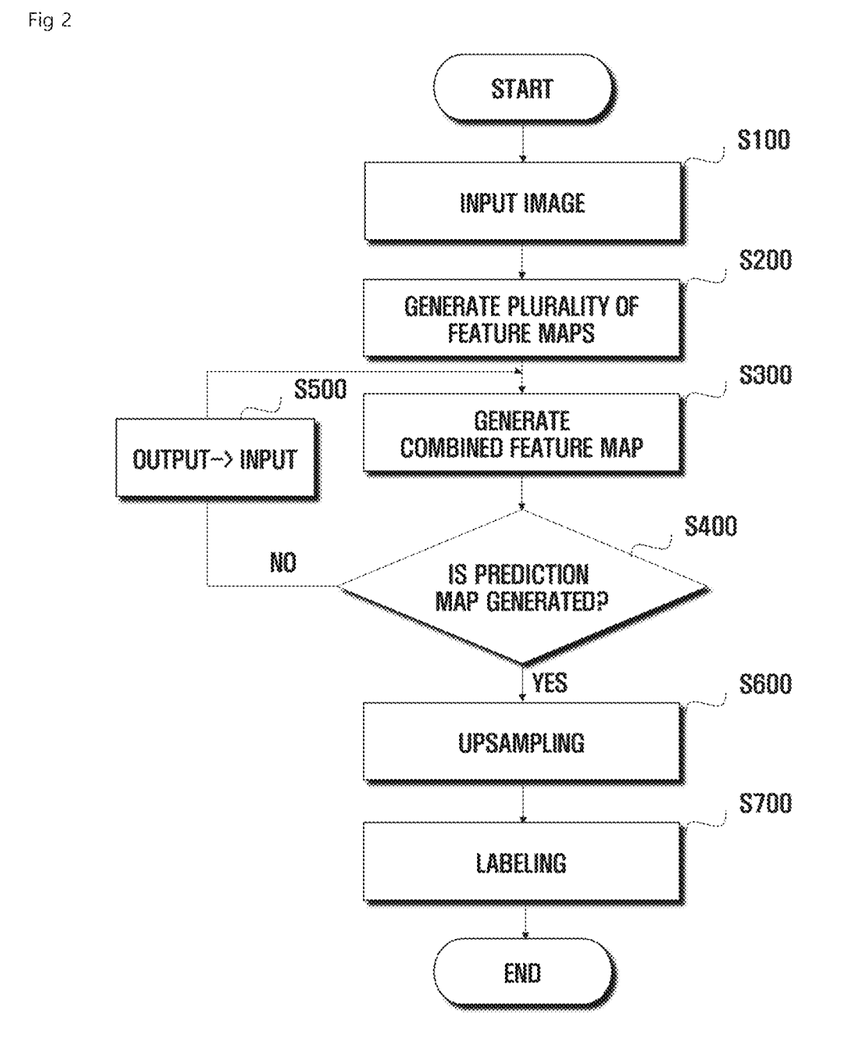
FIG. 2 is a diagram illustrating an image segmentation method according to an embodiment of the disclosure.

FIG. 2 is a diagram illustrating an image segmentation method according to an embodiment of the disclosure. Referring to FIG. 2, when an image is input in operation S100, a processor may acquire a plurality of feature maps having different resolutions with respect to the input image using a feed-forward artificial neural network including a convolution layer and one or more residual blocks in operation S200.

The plurality of feature maps having different resolutions is feature maps output from the convolution layer or one or more residual blocks constituting the feed-forward artificial neural network. The feature map output from the residual block may be a sum of the input map of the residual block and a result obtained by filtering the input map.

The processor may group pairs of adjacent feature maps in the plurality of feature maps and may distinguish between a high-resolution feature map having a relatively high-resolution and a low-resolution feature map having a relatively low-resolution among the pairs of feature maps. In operation S300, the processor may upsample the low-resolution feature map to generate a second upsampling feature map, and may combine the high-resolution feature map and the low-resolution feature map to generate a combined feature map.

Although not shown in the drawing, in operation S300, the processor may upsample the low-resolution feature map in operation S330, may apply a plurality of non-linear function layers to the resolution feature map to collect the context information of the low-resolution feature map, may readjust the high-resolution feature map using the collected context information in operation S350, and may sum up the high-resolution feature map, the readjusted high-resolution feature map, and the upsampled low-resolution feature map in operation S370.

The processor may repeatedly perform operations S300 to S500 recursively until one prediction map is produced as the output of the operation of generating the combined feature map. Here, repeatedly performing operations S300 to S500 recursively means repeatedly performing operations S300 to S400, using the combined feature map (output) generated in operation 300 as an input. That is, the generated combined feature map can be treated as a high-resolution feature map and a low-resolution feature map pair that are to be upsampled and combined in operation S300.

If one prediction map is produced as the result obtained by repeatedly performing operations S300 through S500, the processor may classify one or more objects included in an input image using the prediction map. More specifically, the processor may upsample the prediction map in operation S600 and may classify (predict) the features of the object using predefined classes in operation S700. It can be seen that the depth of the final predicted map upsampled in operation S600 is equal to the number of trained classes, i.e., the number of predefined classes. The prediction map may have the same resolution as the feature map having the highest resolution among the plurality of feature maps.

In operation S700, the processor may assign all of pixels to a class having the highest value along the depth dimension of the upsampled prediction map, i.e., the final prediction map. In other words, segmentation of an image can be performed by labeling the class having the highest value with the pixels of an output image along the depth dimension of the final prediction map.

Hereinafter, the structure of an image segmentation apparatus and a convolutional artificial neural network (B-Net) used therein according to an embodiment of the disclosure will be described with reference to FIG. 3.

Figure 3:
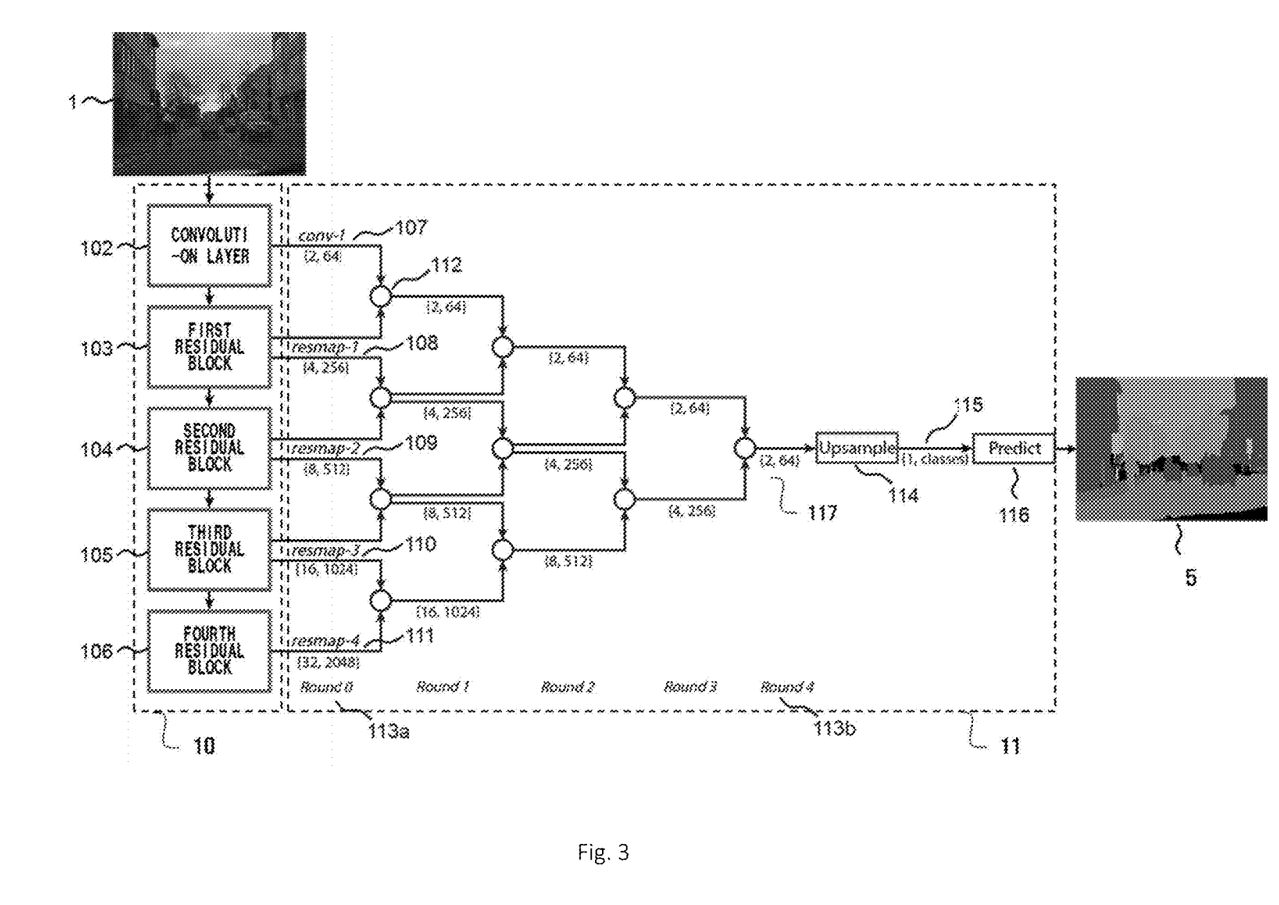
FIG. 3 is a diagram illustrating an image segmentation apparatus according to an embodiment of the disclosure.

Referring to FIG. 3, a control unit 50 of an image segmentation apparatus according to an embodiment of the disclosure may include an encoding module 10 and a decoding module 11.

The encoding module 10 of the B-Net may include a convolution layer 102, a first residual block 103, a second residual block 104, a third residual block 105, and a fourth residual block 106.

The encoding module 10 may obtain a plurality of feature maps having different resolutions with respect to an input image using an artificial neural network including one or more residual blocks. The artificial neural network used here is a feed-forward artificial neural network, and the feed-forward artificial neural network is characterized in that information transmission is fixed in one direction. That is, data may be processed in the order of the first, second, and third residual blocks as shown in FIG. 3.

In the encoding module 10, a plurality of feature maps 107 to 111 having different resolutions with respect to an input image 10 can be calculated. The feature maps are input to the decoding module 11 having a bracket structure, and the decoding module 11 may generate a prediction map 117 through a decoding process according to an embodiment of the disclosure.

The decoding module 11 of the disclosure can be easily mounted on an arbitrary model of a classification-based CNN. For example, ResNet-101 which has been pre-learned based on an ImageNet dataset can be used as the encoding module 10 (backbone CNN). The feature map output from ResNet can be generated by summing an input map with a version filtered by a convolution layer stack to facilitate information transmission during model learning.

The residual block may be a special learning block. The feature map output from the residual block may be a combination of an input to the residual block and the components of a feature map filtered by overlapping the convolution layers to mitigate information propagation in a model training operation.

The spatial resolution of these features can be reduced by half while a channel dimension is deepened through each convolution layer and residual block along a feed-forward process. For example, a feature map (conv-1) 107 output from the convolution layer compared to the input image may have a stride, which is an interval to which a filter is applied, of 2 and a depth of 64 (denoted by {2, 64}). A feature map (resmap-1) 108 output from the first residual block may have a stride and a depth {4, 256}, a feature map (resmap-2) 109 output from the second residual block may have a stride and a depth {8, 512}, a feature map (resmap-3) 110 output from the third residual block may have a stride and a depth {16, 1024}, and a feature map (resmap-4) 111 output from the fourth residual block may have a stride and a depth {32, 2048}. In other words, as an input image 1 passes through each layer (block) from top to bottom in each operation of the encoding module 10, feature maps whose channel dimension is further deepened and spatial resolution is half of the previous operation can be calculated.

The decoding module 11 may perform one or more decoding rounds. Each decoding round may include one or more attention-embedded threefold fusion (ATF) modules 112 that generate a combined feature map 216 using a high-resolution feature map having a high-resolution and a low-resolution feature map having a low-resolution among an adjacent feature map pair constituting the feature map generated in the previous round. At this time, the decoding round can be repeatedly performed until one prediction map is generated.

Figure 4:
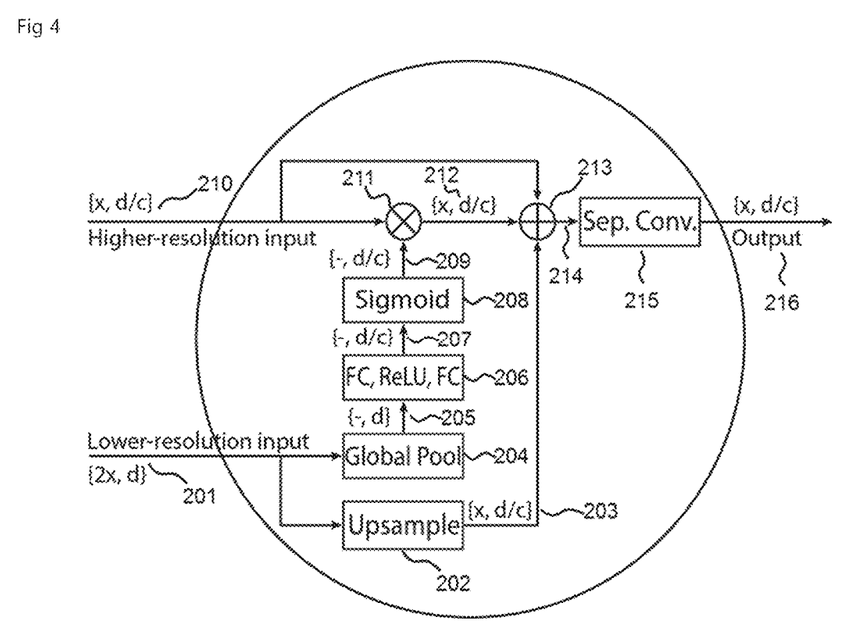
FIG. 4 is a diagram illustrating an attention-embedded threefold fusion (ATF) module for generating a combined feature map in a decoding operation of image segmentation according to an embodiment of the disclosure.

The ATF module 112 may include an up-sampling unit 202 that upsamples a low-resolution feature map, readjustment units 204, 206, 208, and 211 that collect context information of a low-resolution feature map by applying a plurality of non-linear function layers to the low-resolution feature map and readjust a high-resolution feature map using the collected context information, and a summation unit 213 that sums a high-resolution feature map 210, a readjusted high-resolution feature map 212, and an upsampled low-resolution feature map 203. The summation units 213 and 215 may further include a convolution layer 215 applied to a summed result 214. The final output of the ATF module 112 to which the convolution layer is applied can be understood to be the combined feature map 216.

All feature maps except for the feature map (conv-1) 107 having the finest resolution among the feature maps for decoding may be combined with the high-resolution version of the adjacent feature map through the ATF module 112. The dimension of the combined feature map that is the corresponding round output is the same as the resolution of the upper step feature map as shown in FIG. 3. Particularly, the feature maps of the middle layers, for example, 108 to 110 of a 0th round, can be used at the same time in two roles. First, the feature map of the middle layer may incorporate a specific level of global context into the final prediction map by its own upsampling. Second, rich information can be refined by embedding the finer patterned features into the upsampled version of the lower resolution feature map. It is therefore apparent that n feature maps given from a backbone CNN have n−1 outputs (combined feature map) in a first round 113a.

As this routine is repeated in each round, the total number of semantic feature maps is reduced by one through each round and the average spatial dimension is increased through each round until a pixel-wise prediction map having a spatial dimension equal to the spatial dimension of the input image 1 is calculated.

Specifically, when an i-th feature map in an r-th round is $f_i^r$, r=0, ..., and n−1, and i=0, ..., and n−r are satisfied. i=1 denotes a feature map having the highest resolution, and i=n−r denotes a feature map having the lowest resolution. Thus, $f_1^0$ corresponds to the feature map 107 output from the convolution layer in the first round 113a, and $f_8^0$ corresponds to the feature map 111 output from the fourth residual block. The feature map in the next round is determined according to the following equation 1.

$$f_i^r = \mathcal{C}(f_i^{r-1}, f_{i+1}^{r-1}), r \geq 1 \quad \text{[Equation 1]}$$

$\mathcal{C}(\cdot)$ is referred to as ATF 112, and the ATF will be described in more detail with reference to FIG. 4.

A final prediction map 115 having the same depth as the number of predicted classes including the finest pattern features filled with semantically rich context up to a $(n-1)^{th}$ round (e.g., a fourth round 113b because, in the embodiment of FIG. 3, the number of features maps initially calculated from the backbone CNN is n=5) can be obtained through an upsampling layer 114 (the prediction map 115 and the original image 1 have the same spatial size).

A prediction block 116 may infer a final pixel-based labeled map 5 based on calculating a class having the highest weight in the feature map 115. Here, there are two advantages of the bracket structure. One is that ambiguous details can be significantly suppressed since all upsampled feature maps are always integrated into the same in terms of the spatial size. The other is that semantically rich information is densely enhanced because all feature maps from the high-resolution feature map to the low-resolution feature map are mixed in all rounds of the decoding operation.

The ultimate goal of the decoding process of the bracket structure in the B-Net according to the disclosure is to exhaustively utilize middle-level feature maps during the upsampling procedure because a precisely upsampled feature map can have a lot of semantic information. To this end, local ambiguity of the upsampled feature map should be refined, and the disclosure is expected to play an important role in many model designs by effectively incorporating well-represented knowledge in the feature maps learned in the encoding operation through the proposed bracket-style manner.

In order to efficiently use the performance of the decoding module 11 of the bracket structure according to an embodiment of the disclosure, the ATF module 112 may be defined by the attention mechanism along with threefold fusioning followed by separable convolution layers as shown in FIG. 4. More specifically, each ATF module 112 comprehensively collects contextual information from two inputs having different resolutions. That is, first, a semantically rich feature of a low-resolution input 201 can be obtained. Second, low-level features can be obtained in a high-resolution input 210. Third, features with a finer pattern can be directly combined from the high-resolution input 210. Therefore, not only the finely patterned features of the higher-resolution input but also the semantically rich information recalibrated in units of channels by a feedback-like manner of the lower-resolution input can be combined effectively in the output of each module.

In a first fold, the low-resolution input 201 may be upsampled using a transposed convolution layer 202 having a stride of 2 and the number of filters equal to the channel dimension of the high-resolution input 210. Equation for this is as follows.

$$f_{i_u}^{r-1} = \text{upsample}(f_{i+1}^{r-1}) = W_u *^u f_{i+1}^{r-1} + b_u, r \geq 1 \quad \text{[Equation 2]}$$

Here, $*^u$ denotes a fractionally strided convolution operation, $$W_u \in \mathcal{R}_c^{\frac{d}{c} \times 3 \times 3 \times d}$$

denotes an amount of d/c trainable transposed convolution filters, of which each has size of 3×3×d, and $$b_u \in \mathcal{R}_c^{\frac{d}{c}}$$

denotes an upsampling bias parameter. This process allows the network to learn globally contextual information in a precise scale 203 so that it can incorporate finely patterned features in the future.

A second fold is introduced due to the fact that the low-resolution feature map 201 has much more meaningful context information along the depth dimension than the high-resolution feature map 210. The readjustment unit may collect the context information of the low-resolution feature map by applying a plurality of non-linear function layers to the low-resolution feature map and may readjust the high-resolution feature map using the semantically richer context information. The plurality of non-linear function layers may include at least one of a global pooling layer and a hidden layer or two fully connected (FC) layers centered by a ReLU layer and followed by a sigmoid function.

A depth-based attention technique may improve encoded information in a high-resolution input by collecting semantically richer information attributes from channels of low-resolution inputs. That is, each low-resolution input 201, of which the spatial resolution is 1/(2×) of the size of an input image (original image) and the channel dimension is d, is spatially averaged to form a vector of length d. The corresponding Equation is as follows.

$$g = [\mathcal{G}_1(f_{i+1}^{r-1}), \ldots, \mathcal{G}_d(f_{i+1}^{r-1})]^T \quad \text{[Equation 3]}$$

Here, a vector g 205 denotes a result vector of length d, and $\mathcal{G}_d(\cdot)$ denotes a global pooling operation 204 which is performed on a $d^{th}$ channel of the feature map f 201. The corresponding Equation is as follows.

$$\mathcal{G}_d(f_{i+1}^{r-1}) = \frac{1}{H \times W} \sum_{h=1}^{H} \sum_{w=1}^{W} [f_{i+1}^{r-1}(h, w)]_d \quad \text{[Equation 4]}$$

In Equation 4, (h, w) (h=1, ..., and H, and w=1, ..., and W) denotes pixel coordinates of a feature map $f_{i+1}^{r-1}$ having a spatial resolution of H×W. Consequently, all channels of the low-resolution input have their own responses in a d-length vector g 305.

To illustrate the importance of each channel of the high-resolution input, the vector g 205 is filtered by two fully connected (FC) layers centered by ReLU 206 to grasp the relationships between the channels. Here, the size of the hidden layer is set to be equal to the number of channels of the high-resolution input, and this learning operation can be expressed by the following equation.

$$g_{att} = W_{fc_2}[ReLU(W_{fc_1} g + b_{fc_1})] + b_{fc_1}. \quad \text{[Equation 5]}$$

-continued

Here, $\left\{ W_{fc_1} \in \mathcal{R}^{\frac{d}{c} \times d}, b_{fc_1} \in \mathcal{R}^{\frac{d}{c}} \right\}$ and $\left\{ W_{fc_2} \in \mathcal{R}^{\frac{d}{c} \times \frac{d}{c}}, b_{fc_2} \in \mathcal{R}^{\frac{d}{c}} \right\}$ denote trainable parameters of the first and second FC layers, respectively, and a vector $g_{att}$ 207 is calculated from the feature vector of d/c-length.

Next, a sigmoid activation 208 is performed to readjust the responses (also known as, values) of the elements of the vector $g_{att}$ from 0 to 1, and the result 209 is used to adjust the response of the high-resolution input 210 in depth units. The readjusted output 212 is as follows.

$$f_{i_a}^{r-1} = \left\{ [f_i^{r-1}]_\delta \otimes [Sigmoid(g_{att})]_\delta \mid \delta = 1, \ldots, \frac{d}{c} \right\} \quad \text{[Equation 6]}$$

Here, $[.]\delta$ denotes a feature map 210 or a vector 209 corresponding to $\delta^{th}$ channel, and $\otimes$ 211 denotes an element-wise multiplication operator.

Semantically rich information is used differently in the first and second folds, but there is still ambiguity in the pixels of the boundary between different object classes. Thus, a third fold is performed, where fine-resolution input is further taken into account. That is, the high-resolution feature map $f_i^{r-1}$ 210 itself is directly associated as a local detail reference to guide the low-resolution upsampling and an attention scheme to be performed correctly.

Finally, the results of the three folds 203, 212, and 210 are combined into one in 213 and the final result 214 is input to the separable convolution layer 215. As a result, a newly decoded feature map 216 has the same size as the high-resolution input but contains more semantic information in units of pixels.

$$f_i^r = W_{sc} * ReLU(f_{i_u}^{r-1} \oplus f_{i_a}^{r-1} \oplus f_i^{r-1}) \quad \text{[Equation 7]}$$

In Equation 7, * and $\otimes$ 213 denote a sum of convolution and element unit, respectively.

$$W_{sc} = \left\{ W_{df} \in \mathcal{R}^{\frac{d}{c} \times 3 \times 3}, W_{pf} \in \mathcal{R}^{\frac{d}{c} \times 1 \times 1 \times \frac{d}{c}} \right\} \quad \text{[Equation 8]}$$

Equation 8 represents the sequential execution of a d/c depth-wise filters, each has a size of 3×3, and d/c point-wise filters, each has size of 1×1×d/c. This operation can be commonly called as separable convolution layer 215.

The separable convolution layer 215 defined in the ATF performs ReLU activation, separable convolution, and a continuous operation of a batch normalization layer. This can reduce unexpected artifacts caused by the previous upsampling operation rather than using a general 3×3 convolution layer, and can reduce the number of trainable parameters for each layer from d/c×3×3×d/c to d/c×(3×3+d/c), thereby maintaining learning ability efficiently.

The B-Net including the bracket structure according to an embodiment of the disclosure is used together with the ATF module to combine local information (fine pattern feature 210) and global context (semantically rich feature 201) obtained from the entire layer of the backbone CNN, in a balanced manner.

Figure 5:
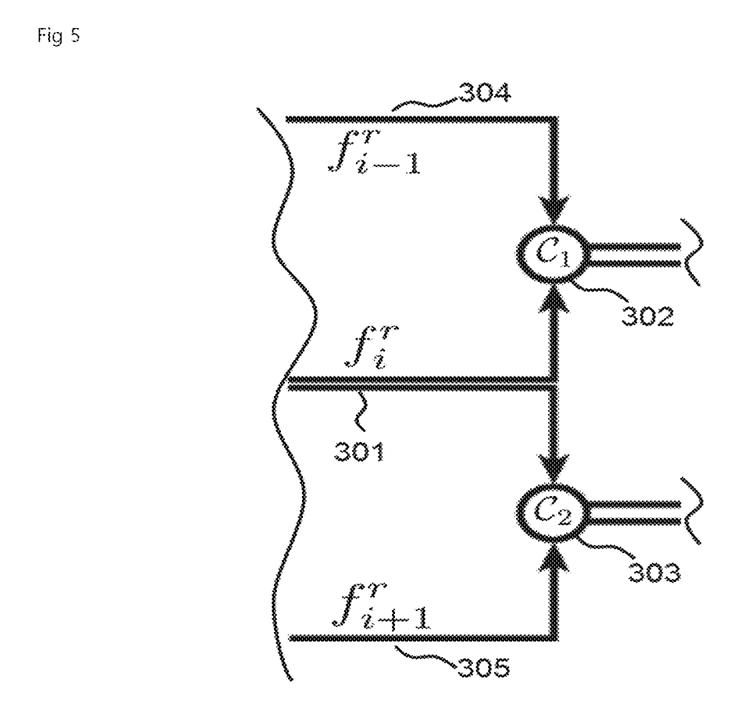
FIG. 5 is a diagram illustrating a method of integrating an ATF module according to an embodiment of the disclosure and a network.

Further, with reference to FIG. 5, an middle-level feature map $f_i^r$ (1<i<n−r, $\forall r$) 301 that plays a different role in two adjacent ATF modules will be described. In the ATF module 112, named $C_1$ 302, $f_i^r$ 301 provides a finer representation of the output through a trainable transposed convolution layer and contributes meaningful information in depth units through an attention mechanism for adjusting the residual input $f_{i-1}^r$ 204. Meanwhile, in the ATF module, named $C_2$ 303, $f_i^r$ 301 allows finely patterned feature to directly contribute to the output, and allow the neural network unit to be adjusted simultaneously by an attention feature vector. As a result, it enables the exhaustive utilization of all middle-level feature maps except for the highest resolution and the lowest resolution in the segmentation network having the bracket structure and ATF connection.

Some embodiments omitted in this specification are equally applicable if their implementation subject is the same. It is to be understood that both the foregoing general description and the following detailed description of the disclosure are exemplary and explanatory and are intended to be exemplary and explanatory only and are not restrictive of the disclosure, the disclosure is not limited to the drawings.

What is claimed is:

1. An image segmentation method comprising:
   obtaining a plurality of feature maps having different resolutions with respect to an input image, using a feed-forward artificial neural network;
   generating a combined feature map by using an adjacent feature map pair in the plurality of features maps, the adjacent feature map pair comprising a high-resolution feature map and a low-resolution feature map having a lower resolution than the high-resolution feature map, the combined feature map generated by combining the high-resolution feature map and an upsampled low-resolution feature map obtained by upsampling the low-resolution feature map;
   repeatedly performing the generating of the combined feature map in a bracket-shaped manner until one prediction map is calculated as an output from the generation of the combined feature maps; and
   classifying one or more objects included in the input image using the prediction map,
   wherein the upsampled low-resolution feature map is calculated using the following Equation;

$$f_{i_u}^{r-1} = \text{upsample}(f_{i+1}^{r-1}) = W_u *^u f_{i+1}^{r-1} + b_u, r \geq 1, \quad \text{[Equation]}$$

where $f_{i+1}^{r-1}$ denotes the low-resolution feature map, $f_{i_u}^{r-1}$ denotes the upsampled low-resolution feature map, $*^u$ denotes a fractionally strided convolution operation, $$W_u \in \mathcal{R}^{\frac{d}{c} \times 3 \times 3 \times d}$$

denotes d/c trainable transposed convolution filters, each has size of 3×3×d, and $$b_u \in \mathcal{R}^{\frac{d}{c}}$$

denotes an upsampling bias parameter.

2. The image segmentation method of claim 1, wherein the generation of the combined feature map comprises
   upsampling the low-resolution feature map;
   collecting semantically rich context information of the low-resolution feature map by applying a plurality of non-linear function layers to the low-resolution feature map and readjusting the high-resolution feature map using the collected semantic context information; and summing the high-resolution feature map, the readjusted high-resolution feature map, and the upsampled low-resolution feature map.

3. The image segmentation method of claim 1, wherein the plurality of feature maps having different resolutions are feature maps output from a convolution layer or one or more residual blocks constituting the feed-forward artificial neural network, and the feature map output from the residual block is obtained by summing an input map of the residual block and a result obtained by filtering the input map.

4. The image segmentation method of claim 1, wherein the prediction map has the same resolution as the feature map having the highest resolution among the plurality of feature maps.

5. The image segmentation method of claim 1, wherein the classification of one or more objects comprises generating a final prediction map having the same size as the input image by upsampling the prediction map; and labeling a class having the highest value with pixels of an output image along a depth dimension of the final prediction map.

6. An image segmentation apparatus comprising:

an encoding module configured to obtain a plurality of feature maps having different resolutions with respect to an input image, using an artificial neural network including one or more residual blocks; and a decoding module configured to generate one prediction map using pairs of adjacent feature maps among the plurality of feature maps, wherein the decoding module performs one or more decoding rounds using an attention-embedded threefold fusion ("ATF") module, each decoding round includes one or more attention-embedded threefold fusion ("ATF") modules that generate a combined feature map by using an adjacent feature map pair constituting the feature map generated in the previous round, the adjacent feature map pair comprising a high-resolution feature map and a low-resolution feature map having a lower resolution than the high-resolution feature map, the combined feature map generated by using the high-resolution feature map and an upsampled low-resolution feature map obtained by upsampling the low-resolution feature map, and the decoding round is repeatedly performed until the one prediction map is generated, wherein the upsampled low-resolution feature map is calculated using the following Equation, $$f_{i_u}^{r-1} = \text{upsample}(f_{i+1}^{r-1}) = W_u *^u f_{i+1}^{r-1} + b_u, r \geq 1,$$ [Equation]

where $f_{i+1}^{r-1}$ denotes the low-resolution feature map, $f_{i_u}^{r-1}$ denotes the upsampled low-resolution feature map, $*^u$ denotes a fractionally strided convolution operation, $$W_u \in \mathcal{R}^{\frac{d}{c} \times 3 \times 3 \times d}$$

denotes d/c trainable transposed convolution filters, each has size of 3×3×d, and $$b_u \in \mathcal{R}^{\frac{d}{c}}$$

denotes an upsampling bias parameter.

7. The image segmentation apparatus of claim 6, wherein the ATF module generates the combined feature map by combining the upsampled low-resolution feature map and the high-resolution feature map.

8. The image segmentation apparatus of claim 6, wherein the ATF module comprises an upsampling unit configured to upsample the low-resolution feature map, a readjustment unit configured to collect context information of the low-resolution feature map by applying a plurality of non-linear function layers to the low-resolution feature map and to readjust the high-resolution feature map using the collected context information, and a summation unit configured to sum the high-resolution feature map, the readjusted high-resolution feature map, and the upsampled low-resolution feature map.

9. The image segmentation apparatus of claim 8, wherein the summation unit further comprises a convolution layer applied to the summed result.

10. The image segmentation apparatus of claim 8, wherein the plurality of non-linear function layers include at least one of a global pooling layer and a hidden layer or two fully connected (FC) layers centered by a ReLU layer and followed by a sigmoid function.

11. The image segmentation apparatus of claim 10, wherein a result vector g of the global pooling layer is calculated according the following Equation, $$g = [\mathcal{G}_1(f_{i+1}^{r-1}), \ldots, \mathcal{G}_d(f_{i+1}^{r-1})]^T,$$ [Equation]

where $$\mathcal{G}_d(f_{i+1}^{r-1}) = \frac{1}{H \times W} \sum_{h=1}^{H} \sum_{w=1}^{W} [f_{i+1}^{r-1}(h, w)]_d$$

denotes a global pooling function performed in a d-th channel of the low-resolution feature map, and (h,w) denotes pixel coordinates (h=1, . . . , and H), (w=1, . . . , and W) of a feature map $f_{i+1}^{r-1}$ having a spatial resolution of H×W.

12. The image segmentation apparatus of claim 8, wherein an output of the readjustment unit corresponds to the following Equations, $$f_{i_a}^{r-1} = \left\{ [f_i^{r-1}]_\delta \otimes [Sigmoid(g_{att})]_\delta \mid \delta = 1, \ldots, \frac{d}{c} \right\}$$ [Equations]

where $[f_i^{r-1}]_\delta$ denotes a feature map corresponding to $\delta^{th}$ channel, $\otimes$ denotes a element-wise multiplication operator, and Sigmoid($g_{att}$) denotes a sigmoid function, $$g_{att} = W_{fc_2}[\text{ReLU}(W_{fc_1}g + b_{fc_1})] + b_{fc_1},$$

where $$W_{fc_1} \in \mathcal{R}^{\frac{d}{c} \times d}, b_{fc_1} \in \mathcal{R}^{\frac{d}{c}}$$

denotes trainable parameters of the first FC layer, and $$W_{fc_2} \in \mathcal{R}^{\frac{d}{c} \times \frac{d}{c}}, b_{fc_2} \in \mathcal{R}^{\frac{d}{c}}$$

denotes trainable parameters of the second FC layer.

13. The image segmentation apparatus of claim 8, wherein the summation unit calculates the combined feature map according to the following Equation, $$f_i^r = W_{sc} * \text{ReLU}(f_{i_u}^{r-1} \oplus f_{i_a}^{r-1} \oplus f_i^{r-1}),$$ [Equation]

where $$W_{sc} = \left\{ W_{df} \in \mathcal{R}^{\frac{d}{c} \times 3 \times 3}, W_{pf} \in \mathcal{R}^{\frac{d}{c} \times 1 \times 1 \times \frac{d}{c}} \right\}$$

denotes sequential execution of d/c depth direction filters, each has size of 3×3 and d/c point direction filters, each has size of 1×1×d/c, $f_i^{r-1}$ denotes the high-resolution feature map, $f_{i_a}^{r-1}$ denotes the readjusted high-resolution feature map, and $f_{i_u}^{r-1}$ denotes the upsampled low-resolution feature map.

14. The image segmentation apparatus of claim 6, wherein the decoding module further comprises an upsampling layer configured to generate a final prediction map by upsampling the prediction map.

15. The image segmentation apparatus of claim 14, further comprising: a prediction block configured to label a class having the highest value with pixels of an output image along a depth dimension of the final prediction map.

16. An image segmentation program that is stored in a non-transitory computer-readable recording medium, wherein the image segmentation program is executed by a processor, the processor if configured to:

obtain a plurality of feature maps having different resolutions with respect to an input image, using a feed-forward artificial neural network;

generating a combined feature map by using an adjacent feature map pair in the plurality of features maps, the adjacent feature map pair comprising a high-resolution feature map and a low-resolution feature map having a lower resolution than the high-resolution feature map, the combined feature map generated by combining the high-resolution feature map and an upsampled low-resolution feature map obtained by upsampling the low-resolution feature map;

repeatedly performing the generating of the combined feature map in a bracket-shaped manner until one prediction map is calculated as an output from the generation of the combined feature maps; and classifying one or more objects included in the input image using the prediction map, wherein the upsampled low-resolution feature map is calculated using the following Equation;

$$f_{i_u}^{r-1} = \text{upsample}(f_{i+1}^{r-1}) = W_u *^u f_{i+1}^{r-1} + b_u, r \geq 1,$$ [Equation]

where $f_{i+1}^{r-1}$ denotes the low-resolution feature map, $f_{i_u}^{r-1}$ denotes the upsampled low-resolution feature map, $*^u$ denotes a fractionally strided convolution operation, $$W_u \in \mathcal{R}^{\frac{d}{c} \times 3 \times 3 \times d}$$

denotes d/c trainable transposed convolution filters, each has size of 3×3×d, and $$b_u \in \mathcal{R}^{\frac{d}{c}}$$

denotes an upsampling bias parameter.

* * * * *